US012807150B2

(12) United States Patent
Lee

(10) Patent No.: US 12,807,150 B2
(45) Date of Patent: Nov. 24, 2026

(54) AUTONOMOUS DRIVING VEHICLE AND CONTROL METHOD THEREOF

(71) Applicants: Hyundai Motor Company, Seoul (KR); Kia Corporation, Seoul (KR)

(72) Inventor: Ho Seok Lee, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 23 days.

(21) Appl. No.: 18/966,822

(22) Filed: Dec. 3, 2024

(65) Prior Publication Data

US 2026/0001538 A1 Jan. 1, 2026

(30) Foreign Application Priority Data

Jun. 28, 2024 (KR) ........................ 10-2024-0085584

(51) Int. Cl.
*B60W 30/14* (2006.01)
*B60W 50/00* (2006.01)

(52) U.S. Cl.
CPC ............ *B60W 30/14* (2013.01); *B60W 50/00* (2013.01); *B60W 2050/0022* (2013.01); *B60W 2510/0657* (2013.01); *B60W 2520/10* (2013.01); *B60W 2540/10* (2013.01); *B60W 2554/802* (2020.02)

(58) Field of Classification Search
CPC ...... B60W 30/14; B60W 30/16; B60W 50/00; B60W 2050/0022; B60W 2510/0657; B60W 2520/10; B60W 2540/10; B60W 2554/802
USPC ............................................................ 701/96
See application file for complete search history.

(56) References Cited

U.S. PATENT DOCUMENTS

| | | | | |
|---|---|---|---|---|
| 10,481,614 | B2 * | 11/2019 | Switkes | G05D 1/0293 |
| 10,520,952 | B1 * | 12/2019 | Luckevich | G05D 1/0289 |
| 2017/0274878 | A1 * | 9/2017 | Fairgrieve | B60T 8/175 |
| 2018/0065628 | A1 * | 3/2018 | Moon | B60W 30/02 |
| 2019/0025857 | A1 * | 1/2019 | Luckevich | G01C 22/00 |
| 2019/0111928 | A1 * | 4/2019 | Son | B60W 30/18063 |
| 2020/0284210 | A1 * | 9/2020 | Song | F02D 29/02 |
| 2022/0097721 | A1 * | 3/2022 | Aggoune | B60W 10/04 |
| 2022/0289193 | A1 * | 9/2022 | Yang | B60W 30/143 |
| 2024/0066984 | A1 * | 2/2024 | Oh | B60W 30/025 |
| 2024/0174087 | A1 * | 5/2024 | Jeon | B60L 15/20 |
| 2025/0229764 | A1 * | 7/2025 | Nishiura | B60W 20/10 |

FOREIGN PATENT DOCUMENTS

| | | | | |
|---|---|---|---|---|
| CN | 111434545 A * | 7/2020 | | B60W 10/04 |
| WO | WO-2023030646 A1 * | 3/2023 | | B60W 20/11 |

* cited by examiner

*Primary Examiner* — Atul Trivedi
(74) *Attorney, Agent, or Firm* — Banner & Witcoff, Ltd.

(57) ABSTRACT

A method for controlling driving of a vehicle is introduced. The method may comprise determining, based on a driver of the vehicle overriding a smart cruise control (SCC) driving, whether another vehicle ahead of the vehicle is detected. The method further comprises determining, based on the other vehicle being detected, a distance between the other vehicle and the vehicle. A plurality of engine torques of the vehicle may be determined based on at least one of the other vehicle being detected or the distance, wherein the plurality of engine torques are different output torques determined based on different conditions. Driving of the vehicle is controlled based on at least one of the plurality of engine torques.

20 Claims, 8 Drawing Sheets

| VEHICLE-TO-VEHICLE DISTANCE(m) | 0 | 10 | 20 | 30 | 50 | 100 | 200 |
|---|---|---|---|---|---|---|---|
| WEIGHTING VALUE A | 0.05 | 0.1 | 0.2 | 0.3 | 0.5 | 0.8 | 1 |

| SPEED (Km/h) | 0 | 10 | 20 | 30 | 40 | 50 |
|---|---|---|---|---|---|---|
| WEIGHTING VALUE B | 0.5 | 0.6 | 0.8 | 1 | 1 | 1 |

AUTONOMOUS DRIVING VEHICLE AND CONTROL METHOD THEREOF

CROSS-REFERENCE TO RELATED APPLICATION

The present application claims the benefit of priority to Korean Patent Application No. 10-2024-0085584, filed in the Korean Intellectual Property Office on Jun. 28, 2024, the entire contents of which are incorporated herein by reference for all purposes.

TECHNICAL FIELD

The present disclosure relates to a vehicle and a control method thereof, and further relates to a vehicle and a control method thereof, which may prevent rapid changes in acceleration or impact caused due to state transition and vehicle-to-vehicle distance invasion by controlling override of a driver during smart cruise control (SCC) driving.

BACKGROUND

The matters described in this Background section are only for the enhancement of understanding of the background of the disclosure, and should not be taken as acknowledgment that they correspond to prior art already known to those skilled in the art.

For a vehicle that may reduce a driver's tiredness by performing driving, braking, and steering on behalf of the driver, an ability to adaptively deal with a surrounding status that changes in real time during driving may be relied on.

The vehicle may have at least one or more autonomous or assistance driving functions.

For example, the smart cruise control (SCC) among the driving functions is a driving convenience function that helps drive at a speed set by a driver while maintaining a distance with an object vehicle during driving, and includes stop and restart.

The smart cruise control may select the vehicle-to-vehicle distance by 1 to 4 stages and enables driving while maintaining a vehicle-to-vehicle distance and a set speed.

For example, the smart cruise control automatically stops if the object vehicle stops and automatically starts when the object vehicle starts within 3 seconds. The smart cruise control starts 3 seconds later if the driver steps on an accelerate pedal or moves a switch, and notifies the driver of a start method through a pop-up after 3 seconds.

In the above-described smart cruise control (SCC), a vehicle-to-vehicle distance between the object vehicle and a subject vehicle may become distant due to the following conditions during control.

For example, when an acceleration value of the object vehicle is relatively faster than that of the subject value, the vehicle-to-vehicle distance becomes distant depending on a required acceleration follow-up performance of the smart cruise control (SCC).

A condition under which a stop request may be issued from a controller (forward camera) of the smart cruise control (SCC) at a stop control is a wheel speed control and a vehicle-to-vehicle distance of the subject vehicle and the stop distance may vary by a stop condition of the object vehicle.

The vehicle-to-vehicle distance during the smart cruise control (SCC) driving may not always maintain 1 to 4 stages adjusted by the driver due to various causes besides the above-described two circumstances. Thus, there may be a case where the driver frequently overrode under the smart cruise control (SCC) condition to offset this.

The smart cruise control (SCC) may have a problem in that, when the pre-set vehicle-to-vehicle distance (1 to 4 stages) is invaded due to the driver's override, the vehicle may be rapidly decelerated to prevent collision and thus braking impact may occur.

SUMMARY

The effects that may be obtained in the present disclosure are not limited to the effects described above, and other effects that have not been described will be clearly understood by those having ordinary knowledge in the technical field to which the present disclosure belongs, from the description below.

According to the present disclosure, a method performed by an apparatus for controlling driving of a vehicle, the method may comprise, determining, based on a driver of the vehicle overriding a smart cruise control (SCC) driving, whether another vehicle ahead of the vehicle is detected, determining, based on the other vehicle being detected at a first time point, a distance between the other vehicle and the vehicle, determining a plurality of engine torques of the vehicle based on at least one of the other vehicle being detected at the first time point or the distance, wherein the plurality of engine torques are different output torques determined based on different conditions, and controlling, based on at least one of the plurality of engine torques, driving of the vehicle.

The method, wherein the determining the plurality of engine torques may comprise, based on the other vehicle not being detected at a second time point, determining a first output torque based on an accelerate pedal value at the driver's override, wherein the first output torque is an engine torque of the vehicle.

The method, wherein the determining the plurality of engine torques may comprise, based on the other vehicle being detected at the first time point, comparing the distance and a pre-set standard distance, and determining an engine torque of the vehicle based on a driving speed of the vehicle and the comparison.

The method, wherein the determining the plurality of engine torques further may comprise, based on the distance being longer than the pre-set standard distance, determining a second output torque based on an accelerate pedal value at the driver's override, wherein the second output torque is the engine torque of the vehicle.

The method, wherein the determining the plurality of engine torques further may comprise, based on the distance being shorter than the pre-set standard distance and based on the driving speed of the vehicle being faster than a pre-set standard speed, determining a third output torque according to a first weighting value, wherein the third output torque is the engine torque of the vehicle.

The method, wherein the determining the plurality of engine torques further may comprise, based on the distance being shorter than the pre-set standard distance and based on the driving speed of the vehicle being slower than the pre-set standard speed, determining a fourth output torque according to a second weighting value, wherein the fourth output torque is the engine torque of the vehicle.

The method, wherein the determining the plurality of engine torques further may comprise, applying, based on the distance, a weighting value to an engine torque, wherein the weighting value increases as the distance increases, and wherein the weighting value is greater than zero and is less than or equal to one.

The method, wherein the determining the plurality of engine torques further may comprise, applying, based on a driving speed of the vehicle, a weighting value to an engine torque, wherein the weighting value increases as the driving speed increases, and wherein the weighting value is greater than zero and is less than or equal to one.

According to the present disclosure, a non-transitory computer-readable recording medium storing instructions that, when executed by one or more processors of a vehicle, are configured to cause the vehicle to, determine, based on a driver of the vehicle overriding a smart cruise control (SCC) driving, whether another ahead of the vehicle is detected, determine, based on the other vehicle being detected, a distance between the other vehicle and the vehicle, determine a plurality of engine torques of the vehicle based on at least one of the other vehicle being detected or the distance, wherein the plurality of engine torques are different output torques determined based on different conditions, and control, based on at least one of the plurality of engine torques, driving of the vehicle.

The non-transitory computer-readable recording medium, wherein the instructions, when executed by the one or more processors, are configured to cause the vehicle to, based on the other vehicle not being detected, determine a first output torque based on an accelerate pedal value at the driver's override, wherein the first output torque is an engine torque of the vehicle.

The non-transitory computer-readable recording medium, wherein the instructions, when executed by the one or more processors, are configured to cause the vehicle to, based on the other vehicle being detected, compare the distance and a pre-set standard distance, and determine an engine torque of the vehicle based on a driving speed of the vehicle and the comparison.

The non-transitory computer-readable recording medium, wherein the instructions, when executed by the one or more processors, are configured to cause the vehicle to, based on the distance being longer than the pre-set standard distance, determine a second output torque based on an accelerate pedal value at the driver's override, wherein the second output torque is the engine torque of the vehicle.

The non-transitory computer-readable recording medium, wherein the instructions, when executed by the one or more processors, are configured to cause the vehicle to, based on the distance being shorter than the pre-set standard distance and based on the driving speed of the vehicle being faster than a pre-set standard speed, determine a third output torque according to a first weighting value, wherein the third output torque is the engine torque of the vehicle.

The non-transitory computer-readable recording medium, wherein the instructions, when executed by the one or more processors, are configured to cause the vehicle to, based on the distance being shorter than the pre-set standard distance and based on the driving speed of the vehicle being slower than the pre-set standard speed, determine a fourth output torque according to a second weighting value, wherein the fourth output torque is the engine torque of the vehicle.

According to the present disclosure, an apparatus for controlling driving of a vehicle may comprise, a plurality of sensors, one or more processors configured to execute instructions, a memory storing the instructions that, when executed by the one or more processors, are configured to cause the apparatus to, determine, based on a driver of the vehicle overriding a smart cruise control (SCC) driving, whether another vehicle ahead of the vehicle is detected, determine, based on the other vehicle being detected, a distance between the other vehicle and the vehicle, determine a plurality of engine torques of the vehicle based on at least one of the other vehicle being detected or the distance, wherein the plurality of engine torques are different output torques determined based on different conditions, and control, based on at least one of the plurality of engine torques, driving of the vehicle.

The apparatus, wherein the instructions, when executed by the one or more processors, are configured to cause the apparatus to, based on the other vehicle not being detected, determine a first output torque based on an accelerate pedal value at the driver's override, wherein the first output torque is an engine torque of the vehicle.

The apparatus, wherein the instructions, when executed by the one or more processors, are configured to cause the apparatus to, based on the other vehicle being detected, compare the distance and a pre-set standard distance, and determine an engine torque of the vehicle based on a driving speed of the vehicle and the comparison.

The apparatus, wherein the instructions, when executed by the one or more processors, are configured to cause the apparatus to, based on the distance being longer than the pre-set standard distance, determine a second output torque based on an accelerate pedal value at the driver's override, wherein the second output torque is the engine torque of the vehicle.

The apparatus, wherein the instructions, when executed by the one or more processors, are configured to cause the apparatus to, based on the distance being shorter than the pre-set standard distance and the driving speed of the vehicle being faster than a pre-set standard speed, determine a third output torque according to a first weighting value, wherein the third output torque is the engine torque of the vehicle.

The apparatus, wherein the instructions, when executed by the one or more processors, are configured to cause the apparatus to, based on the distance being shorter than the pre-set standard distance and the driving speed of the vehicle being slower than the pre-set standard speed, determine a fourth output torque according to a second weighting value, wherein the fourth output torque is the engine torque of the vehicle.

DETAILED DESCRIPTION

Figure 1:
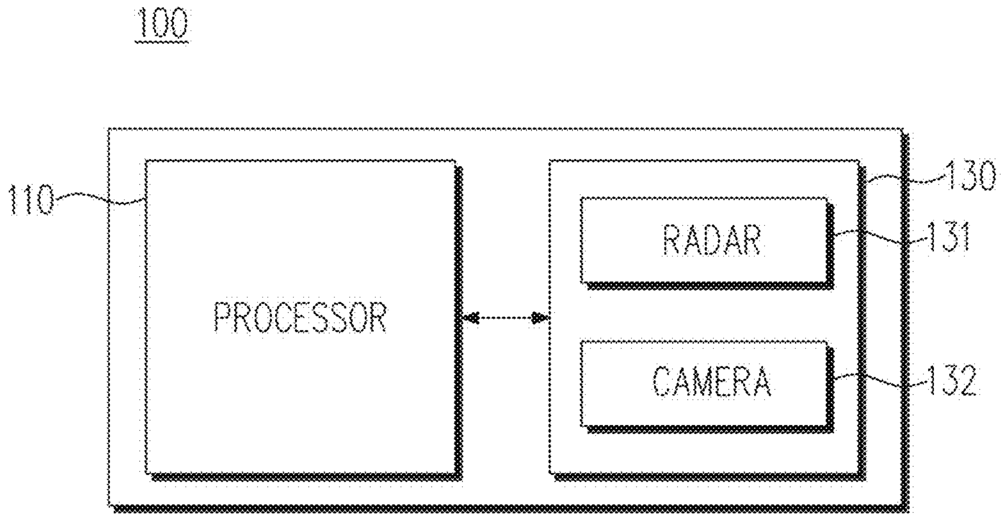
FIG. 1 shows an example of an autonomous driving vehicle according to an example of the present disclosure.

Hereinafter, examples of the present disclosure are described in detail with reference to attached drawings so as to be easily carried out by those having ordinary knowledge in the technical field to which the present disclosure belongs to. However, the present disclosure may be obtained in various different forms and is not limited to examples described here. In addition, parts not related to the description are omitted in drawings to clearly describe the present disclosure, and like reference numerals are used for like portions throughout the specification.

Throughout the specification, when a portion "includes" an element, this means that the portion does not exclude other elements unless otherwise defined, and may further include other elements. In addition, those indicated by like reference numerals mean like elements.

In addition, "unit" and "control unit" included in names such as vehicle control unit (VCU) are only terms widely used in names of a controller that control a specific vehicle function, and do not mean a generic function unit. For example, each controller may include a communication device that communicates with other controllers or sensors to control its function, a memory that stores an operation system, logic commands, or input/output information, and one or more processors that carry out determination, calculation, decision, and the like required to control its function.

For purposes of this application and the claims, using the exemplary phrase "at least one of: A; B; or C" or "at least one of A, B, or C," the phrase means "at least one A, or at least one B, or at least one C, or any combination of at least one A, at least one B, and at least one C. Further, exemplary phrases, such as "A, B, and C", "A, B, or C", "at least one of A, B, and C", "at least one of A, B, or C", etc. as used herein may mean each listed item or all possible combinations of the listed items. For example, "at least one of A or B" may refer to (1) at least one A; (2) at least one B; or (3) at least one A and at least one B.

An automation level of an autonomous driving vehicle may be classified as follows, according to the American Society of Automotive Engineers (SAE). At autonomous driving level 0, the SAE classification standard may correspond to "no automation," in which an autonomous driving system is temporarily involved in emergency situations (e.g., automatic emergency braking) and/or provides warnings only (e.g., blind spot warning, lane departure warning, etc.), and a driver is expected to operate the vehicle. At autonomous driving level 1, the SAE classification standard may correspond to "driver assistance," in which the system performs some driving functions (e.g., steering, acceleration, brake, lane centering, adaptive cruise control, etc.) while the driver operates the vehicle in a normal operation section, and the driver is expected to determine an operation state and/or timing of the system, perform other driving functions, and cope with (e.g., resolve) emergency situations. At autonomous driving level 2, the SAE classification standard may correspond to "partial automation," in which the system performs steering, acceleration, and/or braking under the supervision of the driver, and the driver is expected to determine an operation state and/or timing of the system, perform other driving functions, and cope with (e.g., resolve) emergency situations. At autonomous driving level 3, the SAE classification standard may correspond to "conditional automation," in which the system drives the vehicle (e.g., performs driving functions such as steering, acceleration, and/or braking) under limited conditions but transfer driving control to the driver if the required conditions are not met, and the driver is expected to determine an operation state and/or timing of the system, and take over control in emergency situations but do not otherwise operate the vehicle (e.g., steer, accelerate, and/or brake). At autonomous driving level 4, the SAE classification standard may correspond to "high automation," in which the system performs all driving functions, and the driver is expected to take control of the vehicle only in emergency situations. At autonomous driving level 5, the SAE classification standard may correspond to "full automation," in which the system performs full driving functions without any aid from the driver including in emergency situations, and the driver is not expected to perform any driving functions other than determining the operating state of the system. Although the present disclosure may apply the SAE classification standard for autonomous driving classification, other classification methods and/or algorithms may be used in one or more configurations described herein.

One or more features associated with autonomous driving control may be activated based on configured autonomous driving control setting(s) (e.g., based on at least one of: an autonomous driving classification, a selection of an autonomous driving level for a vehicle, etc.). Based on one or more features (e.g., features of different engine torques of a vehicle) described herein, an operation of the vehicle may be controlled. The vehicle control may include various operational controls associated with the vehicle (e.g., autonomous driving control, sensor control, braking control, braking time control, acceleration control, acceleration change rate control, alarm timing control, forward collision warning time control, etc.).

One or more auxiliary devices (e.g., engine brake, exhaust brake, hydraulic retarder, electric retarder, regenerative brake, etc.) may also be controlled, for example, based on one or more features (e.g., features of different engine torques of a vehicle) described herein.

One or more communication devices (e.g., a modem, a network adapter, a radio transceiver, an antenna, etc., that is capable of communicating via one or more wired or wireless communication protocols, such as Ethernet, Wi-Fi, near-field communication (NFC), Bluetooth, Long-Term Evolution (LTE), 5G New Radio (NR), vehicle-to-everything (V2X), etc.) may also be controlled, for example, based on one or more features (e.g., features of different engine torques of a vehicle) described herein.

Minimum risk maneuver (MRM) operation(s) may also be controlled, for example, based on one or more features (e.g., features of different engine torques of a vehicle) described herein. A minimal risk maneuvering operation (e.g., a minimal risk maneuver, a minimum risk maneuver) may be a maneuvering operation of a vehicle to minimize (e.g., reduce) a risk of collision with surrounding vehicles in order to reach a lowered (e.g., minimum) risk state. A minimal risk maneuver may be an operation that may be activated during autonomous driving of the vehicle if a driver is unable to respond to a request to intervene. During the minimal risk maneuver, one or more processors of the vehicle may control a driving operation of the vehicle for a set period of time.

Biased driving operation(s) may also be controlled, for example, based on one or more features (e.g., features of different engine torques of a vehicle) described herein. A driving control apparatus may perform a biased driving control. To perform a biased driving, the driving control apparatus may control the vehicle to drive in a lane by maintaining a lateral distance between the position of the center of the vehicle and the center of the lane. For example, the driving control apparatus may control the vehicle to stay in the lane but not in the center of the lane. The driving control apparatus may identify or determine a biased target lateral distance for biased driving control. For example, a biased target lateral distance may comprise an intentionally adjusted lateral distance that a vehicle may aim to maintain from a reference point, such as the center of a lane or another vehicle, during maneuvers such as lane changes. This adjustment may be made to improve the vehicle's stability, safety, and/or performance under varying driving conditions, etc. For example, during a lane change, the driving control system may bias the lateral distance to keep a safer gap from adjacent vehicles, considering factors such as the vehicle's speed, road conditions, and/or the presence of obstacles, etc.

One or more sensors (e.g., IMU sensors, camera, LIDAR, RADAR, blind spot monitoring sensor, line departure warning sensor, parking sensor, light sensor, rain sensor, traction control sensor, anti-lock braking system sensor, tire pressure monitoring sensor, seatbelt sensor, airbag sensor, fuel sensor, emission sensor, throttle position sensor, inverter, converter, motor controller, power distribution unit, high-voltage wiring and connectors, auxiliary power modules, charging interface, etc.) may also be controlled, for example, based on one or more features (e.g., features of different engine torques of a vehicle) described herein. An operation control for autonomous driving of the vehicle may include various driving control of the vehicle by the vehicle control device (e.g., acceleration, deceleration, steering control, gear shifting control, braking system control, traction control, stability control, cruise control, lane keeping assist control, collision avoidance system control, emergency brake assistance control, traffic sign recognition control, adaptive headlight control, etc.).

FIG. 1 shows an example of an autonomous driving vehicle according to an example of the present disclosure.

With reference to FIG. 1, an autonomous driving vehicle (100) according to an example of the present disclosure may include a processor (110) and a plurality of sensors (130).

The plurality of sensors (130) may be mounted in a forward portion, a rear portion, and a lateral portion. The plurality of sensors (130) senses the surroundings of the autonomous driving vehicle (100) that is parked/stops or drives, and may provide the processor (110) with sensing information. For example, the sensor (130) may include a radar (131) and a camera (132).

At least one or more of the radars (131) may be mounted in the autonomous driving vehicle (100). The radar (131) may measure a relative speed and a relative distance to a recognized object with a wheel speed sensor (not shown) mounted in the autonomous driving vehicle (100). For example, the radar (131) is mounted in a forward portion and a forward lateral portion of the autonomous driving vehicle and may recognize a forward object. Here, the forward object may include an object vehicle, a forward target vehicle, a target vehicle, and the like.

At least one or more of the cameras (132) may be mounted in the autonomous driving vehicle (100). For example, the camera (132) may include a wide-angle camera. The camera (132) captures an object and a state of the object around the autonomous driving vehicle (100), and put out image data based on the captured information. For example, the camera (132) is mounted in the forward portion and the forward lateral portion of the autonomous driving vehicle (100) and may recognize an object ahead of or at a forward lateral side of the autonomous driving vehicle (100).

The processor (110) is provided with sensing information from the plurality of sensors (130), and may sense a lane of a road where the vehicle drives and an object vehicle (200) that drives ahead or at a forward lateral side.

For example, the processor (110) is provided with sensing information from the plurality of sensors (130), and if it is determined that a driver overrides during the smart cruise control (SCC) driving, may sense whether there exists an object vehicle (200) that drives ahead of the autonomous driving vehicle (100). SCC may be an advanced driver assistance system that automates speed and distance management while driving. Using sensors like radar and cameras, SCC adjusts the vehicle's speed to maintain a safe following distance from the car ahead and may even bring the vehicle to a complete stop in traffic and resume driving automatically. SCC may reduce driver fatigue, enhance safety by minimizing human error, and improve fuel efficiency by optimizing acceleration and braking. While highly effective on highways and in traffic, SCC may rely on clear road conditions and require driver oversight in complex scenarios. Additionally or alternatively, SCC may also comprise idle stop & go (ISG). ISG is a system designed to enhance fuel efficiency and reduce emissions by automatically shutting off the engine if the vehicle is stationary, such as at traffic lights or in traffic jams, and restarting it if the driver is ready to move. The system keeps auxiliary functions like air conditioning and lights operational during engine-off periods. By eliminating unnecessary idling, ISG saves fuel, reduces $CO_2$ emissions, and improves energy efficiency, particularly in urban driving conditions. It may rely on an enhanced starter motor, a robust battery system, and sensors to manage frequent engine restarts.

If the object vehicle (200) is sensed, the processor (110) may analyze the sensed sensing information and calculate a vehicle-to-vehicle distance between the object vehicle (200) and the autonomous driving vehicle (100).

The processor (100) may calculate a first weighting value based on the calculated vehicle-to-vehicle distance between the object vehicle (200) and the autonomous driving vehicle (100).

In addition or alternative, the processor (100) may sense or check a driving speed of the autonomous driving vehicle (100) during the smart cruise control (SCC) driving or a driving speed of the autonomous driving vehicle that is converted due to the driver's override during the smart cruise control (SCC) driving in real time. The processor (110) may calculate a second weighting value based on the sensed driving speed of the autonomous driving vehicle (100).

The processor (110) may apply at least one of the calculated first weighting value and second weighting value, and differently put out engine torques of the autonomous driving vehicle (100) based thereon. Detailed description regarding the processor (11) will be described later.

For example, engine torque may refer to a rotational force generated by an engine, which is responsible for turning the vehicle's crankshaft and, ultimately, the wheels. Measured in units like Newton-meters (Nm) or pound-feet (lb-ft), torque is a factor in determining a vehicle's performance, particularly its ability to accelerate and perform tasks such as towing or climbing. It may be mathematically defined as the product of force and the distance from the axis of rotation. Torque plays a role in a vehicle's drivability, especially at lower engine speeds (RPM), where higher torque may result in better pulling power and quicker acceleration. Torque output may vary with engine speed, and engines may be designed to provide a broad torque curve, delivering substantial force across a wide range of RPMs. According to the present disclosure, engine torque may be dynamically adjusted based on factors such as the distance to a leading vehicle, vehicle speed, and driver inputs during overrides of the Smart Cruise Control (SCC) system. These adjustments may ensure smoother operation, improved safety, and enhanced driving comfort.

Figure 2:
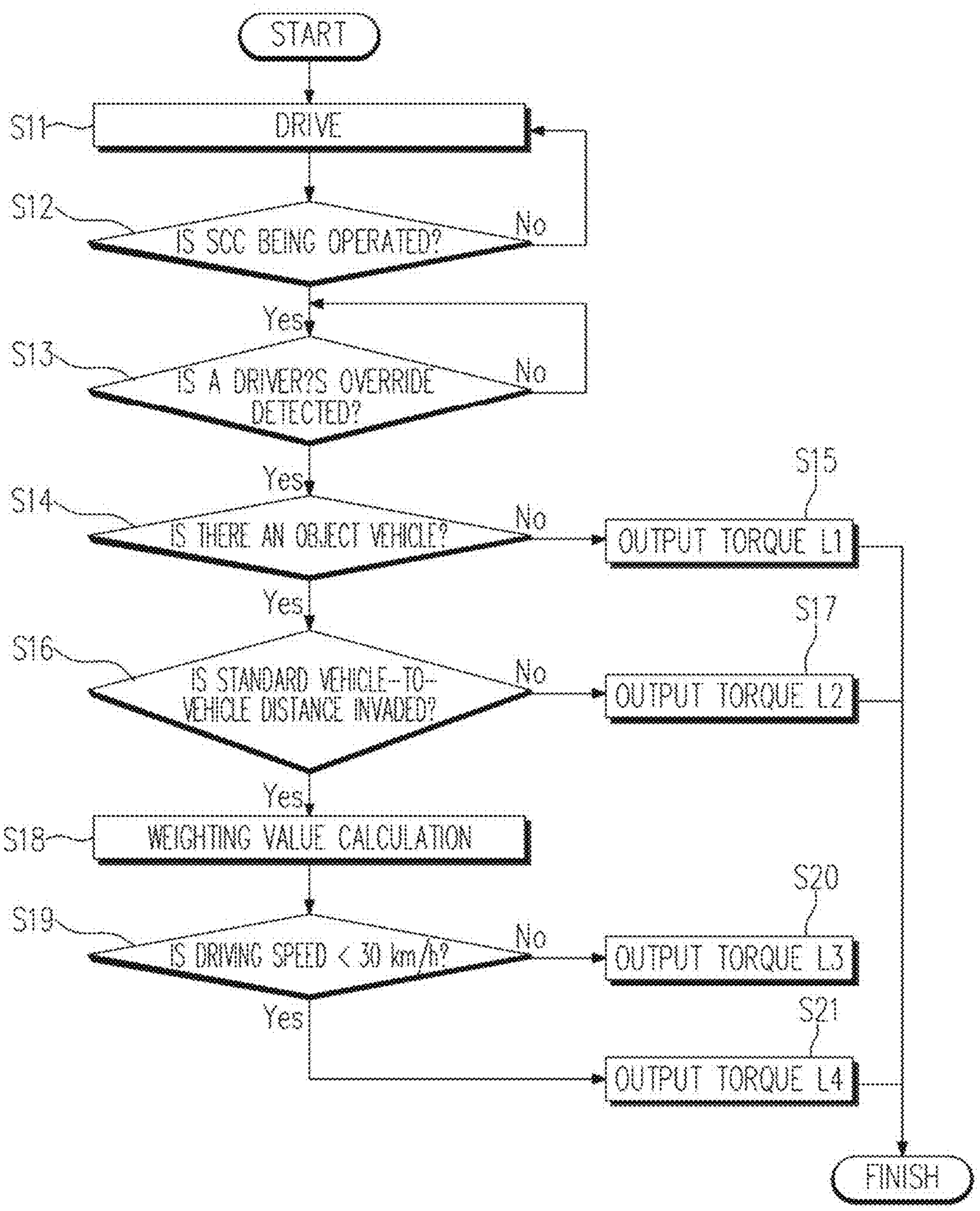
FIG. 2 shows an example of a control method of an autonomous driving vehicle according to an example of the present disclosure.

For convenience, FIG. 2 is described by way of an example in which the steps are performed by a processor (e.g., control circuitry). One, some, or all steps of FIG. 2, or portions thereof, may be performed by one or more other circuits. One or some, steps of FIG. 2 may be omitted, performed in other orders, and/or otherwise modified, and/or one or more additional steps may be added.

FIG. 2 shows an example of a control method of an autonomous driving vehicle according to an example of the present disclosure. FIGS. 3 to 6 are view to describe an output torque according to an example of the present disclosure.

With reference to FIG. 2, the autonomous driving vehicle (100) according to an example of the present disclosure can, under control of the processor (110), drive on a road (S11).

The autonomous driving vehicle (100) can, under control of the processor (110), operate the smart cruise control (SCC) in consideration of a road environment and the like while driving on the road (S12).

The autonomous driving vehicle (100) can, under control of the processor (110), when the driver clicks a cruise button and the like, switch from a general normal driving to the smart cruise control (SCC) driving.

The autonomous driving vehicle (100) is not limited thereto, and can, under control of the processor (110), gather and analyze sensing information and navigation information provided from the plurality of sensors (130), and, if the analyzed result value is determined to be appropriate to the set driving environment, switch from the normal driving to the smart cruise control (SCC) driving.

The autonomous driving vehicle (100) is, under control of the processor (110), provided with sensing information from the plurality of the sensors (130) during the smart cruise control (SCC) driving, and may determine whether the driver overrides (S13).

For example, the autonomous driving vehicle (100) can, under control of the processor (110), if movement of a pedal is detected, check the movement in real time, and, if the movement of the pedal is out of a pre-set movement range, determine that the driver overrides.

The autonomous driving vehicle (100) can, under control of the processor, if it is determined that the driver overrides, sense the object vehicle (200) that drives ahead of the autonomous driving vehicle (100) (S14).

Figure 3:
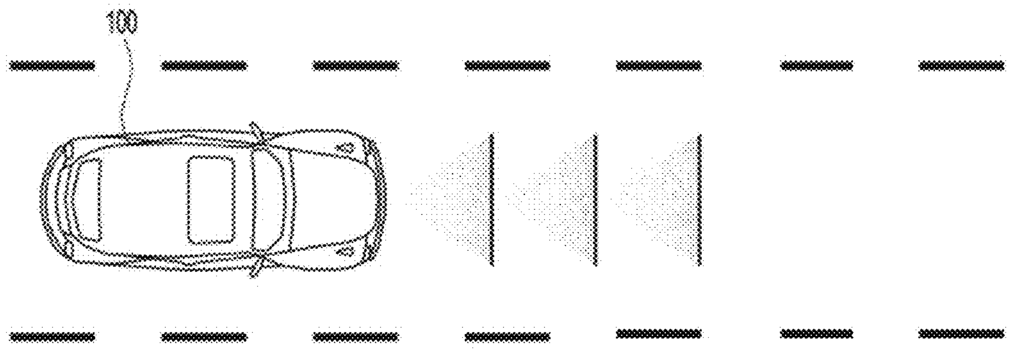
FIG. 3, FIG. 4, FIG. 5, and FIG. 6 are exemplary views to describe an output torque according to an example of the present disclosure.

For example, as shown in FIG. 3, the autonomous driving vehicle (100) can, under control of the processor (110), if the object vehicle is not sensed, put out an engine torque of the autonomous driving vehicle (100) as a first output torque (L1) in response to the determined driver's override (S15).

That is, the autonomous driving vehicle (100) can, under control of the processor (110), if the object vehicle (200) is not sensed, set the output torque due to the driver's override as an output torque of the final override, and put out the engine torque of the autonomous driving vehicle (100) as a first output torque (L1). The autonomous driving vehicle (100) can, under control of the processor (110), if there is no object vehicle, maintain the same state as the existing logic by reflecting an accelerate pedal value during the driver's override by 100% as before.

Figure 4:
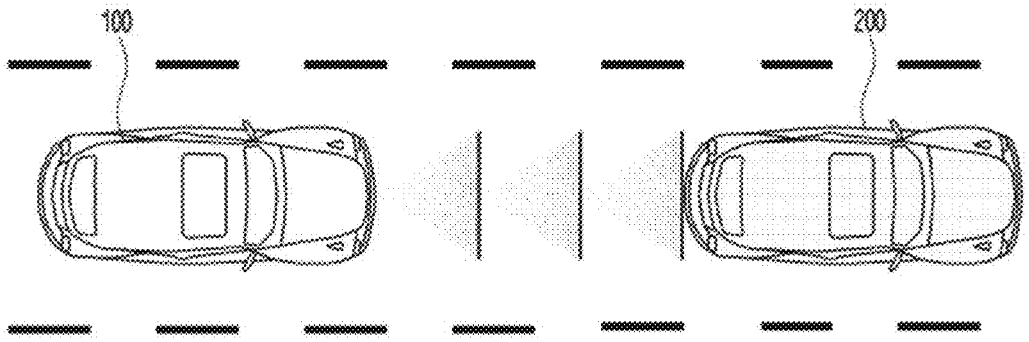

As shown in FIG. 4, the autonomous driving vehicle (100) can, under control of the processor (110), if the object vehicle (200) is sensed, analyze the sensed sensing information and calculate the vehicle-to-vehicle distance between the object vehicle (200) and the autonomous driving vehicle (100) (S16).

At this time, the autonomous driving vehicle (100) can, under control of the processor (110), display the vehicle-to-vehicle distance between the object vehicle (200) and the autonomous driving vehicle via a cluster mounted inside the autonomous driving vehicle (100).

The autonomous driving vehicle (100) can, under control of the processor (110), if the calculated vehicle-to-vehicle distance is longer than the pre-set vehicle-to-vehicle distance, put out an engine torque of the autonomous driving vehicle (100) as a second output torque (L2) in response to the driver's override (S17).

That is, the autonomous driving vehicle (100) can, under control of the processor (110), if the calculated vehicle-to-vehicle distance is longer than the pre-set vehicle-to-vehicle distance, set the output torque due to the driver's override as an output torque of the final override and put out the engine torque of the autonomous driving vehicle (100) as a second output torque (L2).

The autonomous driving vehicle (100) can, under control of the processor (110), if the vehicle-to-vehicle distance calculated during the SCC driving does not invade the pre-set vehicle-to-vehicle distance, put out an engine torque of the autonomous driving vehicle (100) corresponding to an accelerate pedal value as a second output torque (L2).

The autonomous driving vehicle (100) can, under control of the processor (110), if the calculated vehicle-to-vehicle distance is shorter than the pre-set vehicle-to-vehicle distance, calculate at least one of the first weighting value and the second weighting value (S18).

For example, the autonomous driving vehicle (100) can, under control of the processor (110), calculate the first weighting value based on the calculated vehicle-to-vehicle distance between the object vehicle and the autonomous driving vehicle (100).

The autonomous driving vehicle (100) can, under control of the processor (110), sense or check a driving speed of the autonomous driving vehicle (100) during the smart cruise control (SCC) driving or a driving speed of the autonomous driving vehicle (100) that is converted due to the driver's override during the smart cruise control (SCC) driving in real time.

The autonomous driving vehicle (100) can, under control of the processor (110), calculate a second weighting value based on the sensed driving speed of the autonomous driving vehicle (100).

Figure 5:
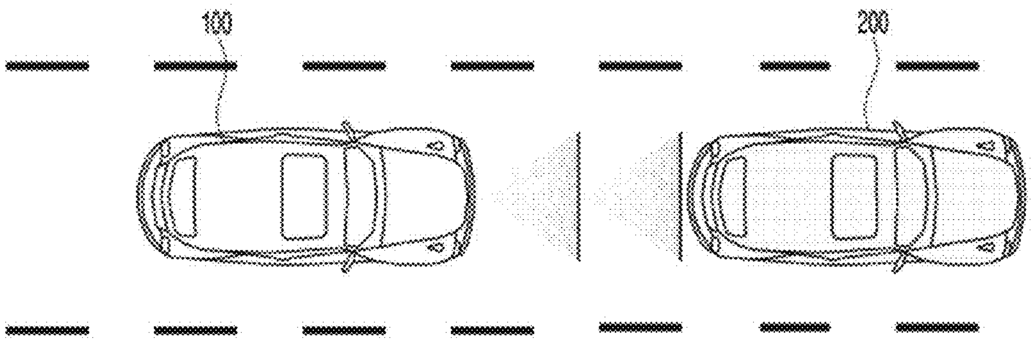

For example, as shown in FIG. 5, the autonomous driving vehicle (100) can, under control of the processor (110), if the vehicle-to-vehicle during the SSC driving is shorter than the standard vehicle-to-vehicle distance and the driving speed is 30 km or more (S19), apply the first weighting value and put out an engine torque of the autonomous driving vehicle (100) as a third output torque (L3) (S20). That is, the autonomous driving vehicle (100) can, under control of the processor (110), if the vehicle-to-vehicle distance is invaded during the SCC driving, put out an engine torque of the autonomous driving vehicle (100) by applying the first weighting value (ⓐ(%)) than the existing one. The vehicle-to-vehicle distance is invaded if the gap or distance between the subject vehicle and a leading vehicle becomes smaller than a predefined safe or standard distance. This standard distance may be set by the Smart Cruise Control (SCC) system to maintain safe following distances and avoid potential collisions. The vehicle-to-vehicle distance may be the minimum safe distance that the SCC system is programmed to maintain between the subject vehicle and the leading vehicle. It may ensure adequate reaction time and braking distance. If the distance between the two vehicles becomes less than this standard, it is considered invaded. This may happen if the leading vehicle slows down unexpectedly or if the subject vehicle approaches too closely due to driver override or other factors. If the standard distance is invaded, the system triggers specific actions, such as adjusting engine torque (e.g., reducing acceleration or applying a weighting value) to restore the safe distance or mitigate collision risks.

Figure 6:
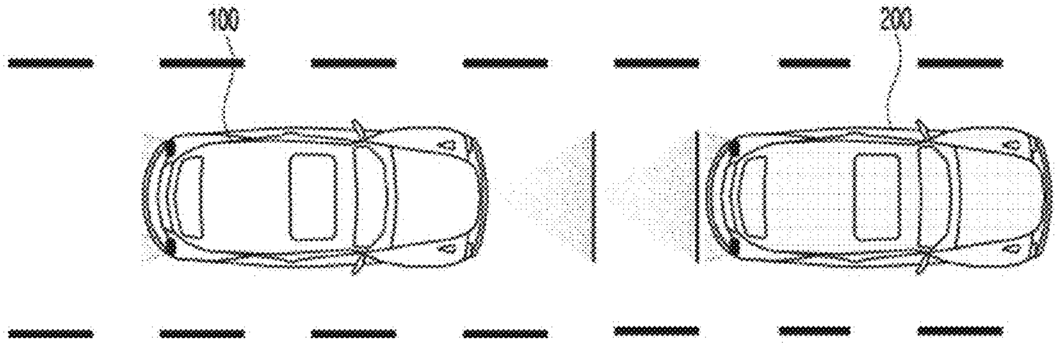

Unlike this, as shown in FIG. 6, the autonomous driving vehicle (100) can, under control of the processor (110), if the vehicle-to-vehicle distance is invaded during the SCC driving and the driving speed is 30 km or less (S19), apply the first weighting value and the second weighting value together and put out an engine torque of the autonomous driving vehicle (100) as a fourth output torque (L4) (S21). That is, the autonomous driving vehicle (100) can, under control of the processor (110), if the driver override during the SCC driving in a low speed area or after stop, put out an engine torque of the autonomous driving vehicle (100) by further applying the second weighting value (ⓑ%) to the first weighting value (ⓐ(%)) than the existing one.

FIG. 7 shows an example of a torque weighting value and a vehicle-to-vehicle distance of a driver's override according to an example of the present disclosure.

Figures 7A, 7B:
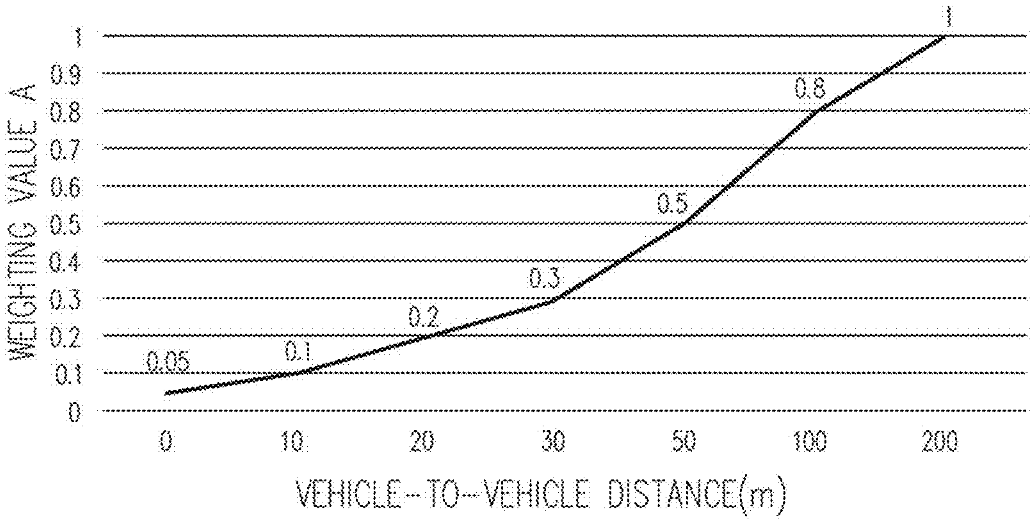
FIG. 7A and FIG. 7B show examples of a torque weighting value and a vehicle-to-vehicle distance of a driver's override according to an example of the present disclosure.

As shown in FIG. 7A, a horizontal direction of FIG. 7A indicates vehicle-to-vehicle distance, a vertical direction of FIG. 7A indicates first weighting value, and FIG. 7B is a table showing that the first weighting value varies by the vehicle-to-vehicle distance.

As shown in FIG. 7, the first weighting value may be gradually decreased or increased in response to the vehicle-to-vehicle distance. For example, the first weighting value may be increased as the vehicle-to-vehicle distance is increased.

FIG. 8 shows an example of a torque weighting value and a speed of a driver's override according to an example of the present disclosure.

Figures 8A, 8B:
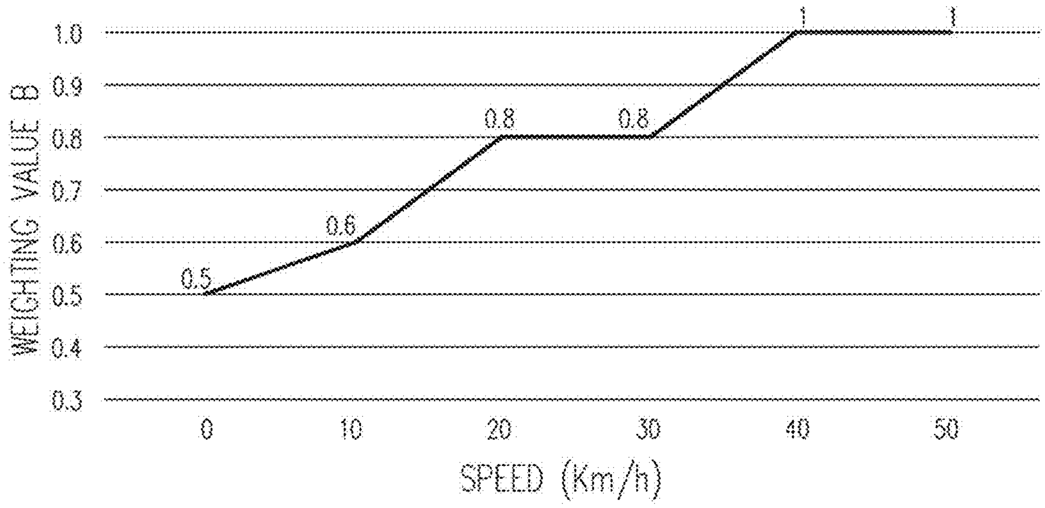
FIG. 8A and FIG. 8B show examples of a torque weighting value and a speed of a driver's override according to an example of the present disclosure.

As shown in FIG. 8A, a horizontal direction of FIG. 8A indicates speed, a vertical direction of FIG. 8A indicates second weighting value, and FIG. 8B is a table showing that the first weighting value varies by the speed.

As shown in FIG. 8, the second weighting value may be gradually decreased or increased in response to the speed. For example, the second weighting value is increased as the speed is increased, and if the speed is a certain speed or more, the second weighting value may be maintained as a constant value.

An object of the present disclosure is to provide a vehicle and a control method thereof, which may prevent rapid changes in acceleration or impact caused due to state transition and vehicle-to-vehicle distance invasion by controlling override of a driver during smart cruise control (SCC) driving.

Technical tasks that the present disclosure is to achieve are not limited to the technical tasks described above, and other technical tasks that have not been described will be clearly understood by those having ordinary knowledge in the technical field to which the present disclosure belongs from the description below.

To achieve the technical tasks described above, there is provided a control method of a vehicle including a processor, comprising: under control of the processor, if it is determined that a driver overrides during a smart cruise control (SCC) driving, detecting an object vehicle that drives ahead of the vehicle; if the object vehicle is detected, determining a distance between the object vehicle and the vehicle; and differently determining engine torques of the vehicle according to the detection of the object vehicle or the distance between the object vehicle and the vehicle.

In addition or alternative, according to an example of the present disclosure, differently determining the engine torques may comprise if the object vehicle is not detected, determining a first output torque based on an accelerate pedal value at the driver's override as the engine torque of the vehicle.

In addition or alternative, according to an example of the present disclosure, differently determining the engine torques may further comprise if the object vehicle is detected, comparing the distance and a pre-set standard distance, and determining an engine torque of the vehicle according to a driving speed of the vehicle based on a result of the comparison.

In addition or alternative, according to an example of the present disclosure, differently determining the engine torques may further comprise if the distance is longer than the pre-set standard distance, determining a second output torque based on an accelerate pedal value at the driver's override as the engine torque of the vehicle.

In addition or alternative, according to an example of the present disclosure, differently determining the engine torques may further comprise if the distance between the object vehicle and the vehicle is shorter than the pre-set standard distance and the driving speed of the vehicle is faster than a pre-set standard speed, determining a third output torque with a first weighting value applied as the engine torque of the vehicle.

In addition or alternative, according to an example of the present disclosure, differently determining the engine torques may further comprise if the distance between the object vehicle and the vehicle is shorter than the pre-set standard distance and the driving speed of the vehicle is slower than the pre-set standard speed, determining a fourth output torque with a second weighting value additionally applied as the engine torque of the vehicle.

Also, according to an example of the present disclosure, there is provided a non-transitory computer-readable recording medium storing instructions, wherein the instructions, when executed by one or more processors of a vehicle, cause the one or more processors to: if it is determined that a driver overrides during a smart cruise control (SCC) driving, detect an object vehicle that drives ahead of the vehicle; if the object vehicle is detected, determine a distance between the object vehicle and the vehicle; and differently determine engine torques of the vehicle according to the detection of the object vehicle or the distance between the object vehicle and the vehicle.

In addition or alternative, to achieve the technical tasks described above, according to an example of the present disclosure, there is provided a vehicle comprising: a plurality of sensors; a non-transitory memory storing instructions; and one or more processors configured to execute the instructions, wherein the instructions, if executed by the one or more processors, cause the one or more processors to if it is determined that a driver overrides during a smart cruise control (SCC) driving, detect an object vehicle that drives ahead of the vehicle, if the object vehicle is detected, determine a distance between the object vehicle and the vehicle, and differently determine engine torques of the vehicle according to the detection of the object vehicle or the distance between the object vehicle and the vehicle.

In addition or alternative, differently determining the engine torques may comprise if the object vehicle is not detected, determining a first output torque based on an accelerate pedal value at the driver's override as the engine torque of the vehicle.

In addition or alternative, differently determining the engine torques may further comprise if the object vehicle is detected, comparing the distance and a pre-set standard distance, and determining an engine torque of the vehicle according to a driving speed of the vehicle based on a result of the comparison.

In addition or alternative, differently determining the engine torques may further comprise if the distance is longer than the pre-set standard distance, determining a second output torque based on an accelerate pedal value at the driver's override as the engine torque of the vehicle.

In addition or alternative, differently determining the engine torques may further comprise if the distance between the object vehicle and the vehicle is shorter than the pre-set standard distance and the driving speed of the vehicle is faster than a pre-set standard speed, determining a third output torque with a first weighting value applied as the engine torque of the vehicle.

In addition or alternative, differently determining the engine torques may further comprise if the distance between the object vehicle and the vehicle is shorter than the pre-set standard distance and the driving speed of the vehicle is slower than the pre-set standard speed, determining a fourth output torque with a second weighting value additionally applied as the engine torque of the vehicle.

The vehicle and the control method thereof of the present disclosure as configured described above may enhance convenience and a sense of luxury by performing consistent control without a large change in acceleration even if a driver steps on a pedal and overrides in a smart cruise control (SCC) driving state.

The vehicle and the control method thereof of the present disclosure may improve ride comfort of the vehicle by subdividing override conditions of a driver during the smart cruise control (SCC) driving and maintaining control consistency during the smart cruise control (SCC) driving.

The vehicle and the control method thereof of the present disclosure may enhance a sense of luxury for functions of the smart cruise control (SCC) by reducing rapid changes in acceleration in a system state transition area at a time of the driver accelerate pedal ON/OFF during the smart cruise control (SCC) driving.

The vehicle and the control method thereof of the present disclosure may improve efficiency by adjusting a vehicle-to-vehicle distance due to an accelerate pedal by a driver's intention during the smart cruise control (SCC) driving.

As described hereinabove, the autonomous driving vehicle according to an example of the present disclosure can, under control of the processor, apply a logic to a forward camera to minimize a sense of foreignness due to the state transition during the SCC control, and proceed to control a required acceleration and a required torque value in the forward camera and the ESC even if a driver's override is proceeded during the SCC control.

For example, the autonomous driving vehicle according to an example of the present disclosure can, under control of the processor, enhance convenience and reliability by performing consistent control without a large change in acceleration even if the driver steps on a pedal and overrides in a smart cruise control (SCC) driving state.

For example, the autonomous driving vehicle according to an example of the present disclosure can, under control of the processor, improve ride comfort of the vehicle by subdividing override conditions of the driver during the smart cruise control (SCC) driving and maintaining control consistency during the smart cruise control (SCC) driving.

For example, the autonomous driving vehicle according to an example of the present disclosure can, under control of the processor, enhance reliability for functions of the smart cruise control (SCC) by reducing rapid changes in acceleration in a system state transition area at a time of the driver accelerate pedal ON/OFF during the mart cruise control (SCC) driving.

The processor may be a central processing unit (CPU) or a semiconductor device that processes instructions stored in a memory and/or a storage. The memory and the storage may include various types of volatile or non-volatile storage media. For example, the memory may include a read only memory (ROM) and a random access memory (RAM).

Accordingly, the operations of the method or algorithm described in connection with the examples disclosed in the specification may be directly implemented with a hardware module, a software module, or a combination of the hardware module and the software module, which is executed by the processor. The software module may reside on a storage medium (that is, the memory and/or the storage) such as a RAM, a flash memory, a ROM, an EPROM, an EEPROM, a register, a hard disc, a removable disk, and a CD-ROM.

The exemplary storage medium may be coupled to the processor. The processor may read out information from the storage medium and may write information in the storage medium. Alternatively, the storage medium may be integrated with the processor. The processor and the storage medium may reside in an application specific integrated circuit (ASIC). The ASIC may reside within a user terminal. In another case, the processor and the storage medium may reside in the user terminal as separate components.

For example, the autonomous driving vehicle according to an example of the present disclosure may improve efficiency by adjusting a vehicle-to-vehicle distance due to an accelerate pedal by a driver's intention during the smart cruise control (SCC) driving.

The present disclosure described above may be implemented as a computer-readable code on a medium on which a program is recorded. The computer-readable medium includes all kinds of recording devices in which data that may be read by a computer system is stored. Examples of the computer-readable media include hard disk drive (HDD), solid state disk (SSD), silicon disk drive (SDD), ROM, RAM, CD-ROM, magnetic tape, floppy disk, optical data storage device, and the like.

Therefore, the above detailed description should not be construed as being limited, and should be considered as being exemplary. The scope of the present disclosure should be determined by reasonable interpretation of the attached claims, and all modifications within the equivalent scope of the present disclosure are included in the scope of the present disclosure.

What is claimed is:

1. A method for controlling driving of a vehicle, the method comprising:

determining, based on an accelerator pedal input received during a smart cruise control (SCC) driving, whether a driver override has occurred;

determining a speed of the vehicle and a distance between the vehicle and a preceding vehicle;

determining, based on the speed and the distance, a plurality of driving conditions;

determining an output torque by applying, to a first torque corresponding to the accelerator pedal input during the driver override, a weighting value corresponding to each of the plurality of driving conditions; and controlling, based on the output torque, driving of the vehicle.

2. The method of claim 1, further comprising:
determining whether the preceding vehicle driving ahead of the vehicle is detected; and
based on the preceding vehicle not being detected, controlling the vehicle based on the first torque.

3. The method of claim 1, further comprising:
determining whether the preceding vehicle driving ahead of the vehicle is detected; and
based on the preceding vehicle being detected, determining the distance.

4. The method of claim 3, further comprising:
determining whether the distance is longer than or equal to a preset reference distance; and
based on the distance being longer than or equal to the preset reference distance, controlling the vehicle based on the first torque.

5. The method of claim 3, further comprising:
determining whether the distance is longer than or equal to a preset reference distance; and
based on the distance being shorter than the preset reference distance, determining a second torque by applying a first weighting value to the first torque.

6. The method of claim 5, wherein the first weighting value is proportional to the distance.

7. The method of claim 5, further comprising:
determining whether the speed of the vehicle is greater than or equal to a preset reference speed; and
based on the speed being greater than or equal to the preset reference speed, determining the second torque as the output torque.

8. The method of claim 5, further comprising:
determining whether the speed of the vehicle is greater than or equal to a preset reference speed;
based on the speed being less than the preset reference speed, determining a third torque by applying a second weighting value to the second torque; and
determining the third torque as the output torque.

9. The method of claim 8, wherein the second weighting value is proportional to the speed of the vehicle.

10. A non-transitory computer-readable recording medium storing instructions that, when executed by one or more processors of a vehicle, are configured to cause the vehicle to:
determine, based on an accelerator pedal input received during a smart cruise control (SCC) driving, whether a driver override has occurred;
determine a speed of the vehicle and a distance between the vehicle and a preceding vehicle;
determine, based on the speed and the distance, a plurality of driving conditions;
determine an output torque by applying, to a first torque corresponding to the accelerator pedal input during the driver override, a weighting value corresponding to each of the plurality of driving conditions; and
control, based on the output torque, driving of the vehicle.

11. A vehicle comprising:
a plurality of sensors;
one or more processors; and
a memory storing instructions that, when executed by the one or more processors, are configured to cause the vehicle to:
determine, based on an accelerator pedal input received during a smart cruise control (SCC) driving, whether a driver override has occurred;
determine a speed of the vehicle and a distance between the vehicle and a preceding vehicle;
determine, based on the speed and the distance, a plurality of driving conditions;
determine an output torque by applying, to a first torque corresponding to the accelerator pedal input during the driver override, a weighting value corresponding to each of the plurality of driving conditions; and
control, based on the output torque, driving of the vehicle.

12. The vehicle according to claim 11, wherein the instructions, when executed by the one or more processors, are configured to cause the vehicle to:
determine whether the preceding vehicle driving ahead of the vehicle is detected; and
based on the preceding vehicle not being detected, control the vehicle based on the first torque.

13. The vehicle according to claim 11, wherein the instructions, when executed by the one or more processors, are configured to cause the vehicle to:
determine whether the preceding vehicle driving ahead of the vehicle is detected; and
based on the preceding vehicle being detected, determine the distance.

14. The vehicle according to claim 13, wherein the instructions, when executed by the one or more processors, are configured to cause the vehicle to:
determine whether the distance is longer than or equal to a preset reference distance; and
based on the distance being longer than or equal to the preset reference distance, control the vehicle based on the first torque.

15. The vehicle according to claim 13, wherein the instructions, when executed by the one or more processors, are configured to cause the vehicle to:
determine whether the distance is longer than or equal to a preset reference distance; and
based on the distance being shorter than the preset reference distance, determine a second torque by applying a first weighting value to the first torque.

16. The vehicle according to claim 15, wherein the first weighting value is proportional to the distance.

17. The vehicle according to claim 15, wherein the instructions, when executed by the one or more processors, are configured to cause the vehicle to:
determine whether the speed of the vehicle is greater than or equal to a preset reference speed; and
based on the speed being greater than or equal to the preset reference speed, determine the second torque as the output torque.

18. The vehicle according to claim 15, wherein the instructions, when executed by the one or more processors, are configured to cause the vehicle to:
determine whether the speed of the vehicle is greater than or equal to a preset reference speed; and
based on the speed being less than the preset reference speed, determine a third torque by applying a second weighting value to the second torque; and
determine the third torque as the output torque.

19. The vehicle according to claim 18, wherein the second weighting value is proportional to the speed of the vehicle.

20. The vehicle according to claim 11, wherein the instructions, when executed by the one or more processors, are configured to cause the vehicle to:
determine whether the distance satisfies a first condition;
determine whether the speed of the vehicle satisfies a second condition;

based on both the first condition and the second condition not being satisfied, determine the first torque as the output torque;

based on the first condition being satisfied and the second condition not being satisfied, determine the output torque by applying a first weighting value to the first torque; and based on both the first condition and the second condition being satisfied, determine the output torque by applying the first weighting value and a second weighting value to the first torque.

* * * * *